US009145329B2

(12) United States Patent
Drake et al.

(10) Patent No.: US 9,145,329 B2
(45) Date of Patent: Sep. 29, 2015

(54) ALKALINE EARTH ALUMINO-SILICATE GLASS COMPOSITIONS WITH IMPROVED CHEMICAL AND MECHANICAL DURABILITY

(71) Applicant: Corning Incorporated, Corning, NY (US)

(72) Inventors: Melinda Ann Drake, Corning, NY (US); Robert Michael Morena, Lindley, NY (US)

(73) Assignee: Corning Incorporated, Corning, NY (US)

( * ) Notice: Subject to any disclaimer, the term of this patent is extended or adjusted under 35 U.S.C. 154(b) by 217 days.

(21) Appl. No.: 13/660,141

(22) Filed: Oct. 25, 2012

(65) Prior Publication Data

US 2013/0101853 A1 Apr. 25, 2013

Related U.S. Application Data

(60) Provisional application No. 61/551,133, filed on Oct. 25, 2011.

(51) Int. Cl.
*C03C 3/087* (2006.01)
*C03C 21/00* (2006.01)

(52) U.S. Cl.
CPC .............. *C03C 3/087* (2013.01); *C03C 21/002* (2013.01); *Y10T 428/315* (2015.01)

(58) Field of Classification Search
CPC ................................ C03C 3/085; C03C 3/087
USPC ....................................................... 501/69, 70
See application file for complete search history.

(56) References Cited

U.S. PATENT DOCUMENTS

| | | | |
|---|---|---|---|
| 3,054,686 A | 9/1962 | Hagedorn | |
| RE25,456 E | 10/1963 | Bacon et al. | |
| 3,351,474 A | 11/1967 | Hagedorn et al. | |
| 3,490,885 A | 1/1970 | Hammer | |
| 3,524,738 A | 8/1970 | Grubb et al. | |
| 3,772,135 A | 11/1973 | Hara et al. | |
| 3,844,754 A | 10/1974 | Grubb et al. | |
| 3,900,329 A | 8/1975 | Grubb et al. | |
| 4,065,317 A | 12/1977 | Baak et al. | |
| 4,161,556 A | 7/1979 | Lenard et al. | |
| 4,312,953 A | 1/1982 | Mills et al. | |
| 4,689,085 A | 8/1987 | Plueddemann | |
| 5,114,757 A | 5/1992 | Linde et al. | |
| 5,286,527 A | 2/1994 | Blum et al. | |
| 5,721,181 A | 2/1998 | Sehgal et al. | |
| 5,736,476 A | 4/1998 | Watzke et al. | |
| 5,854,153 A | 12/1998 | Kohli | |
| 6,096,432 A | 8/2000 | Sakaguchi et al. | |
| 6,156,399 A | 12/2000 | Spallek et al. | |
| 6,214,429 B1 | 4/2001 | Zou et al. | |
| 6,333,285 B1 | 12/2001 | Chopinet et al. | |
| 6,472,068 B1 | 10/2002 | Glass et al. | |
| 6,518,211 B1 | 2/2003 | Bradshaw et al. | |
| 6,561,275 B2 | 5/2003 | Glass et al. | |
| 6,630,420 B1 | 10/2003 | Naumann et al. | |
| 6,794,323 B2 | 9/2004 | Peuchert et al. | |
| 6,818,576 B2 | 11/2004 | Ikenishi et al. | |
| 6,939,819 B2 | 9/2005 | Usui et al. | |
| 7,087,307 B2 | 8/2006 | Nagashima et al. | |
| 7,315,125 B2 | 1/2008 | Kass | |
| 7,470,999 B2 | 12/2008 | Saito et al. | |
| 8,518,545 B2 * | 8/2013 | Akiba et al. ................. | 428/410 |
| 8,551,898 B2 | 10/2013 | Danielson et al. | |
| 9,012,343 B2 | 4/2015 | Yamamoto et al. | |
| 2004/0096588 A1 | 5/2004 | Brandt | |
| 2007/0004580 A1 | 1/2007 | Kass | |
| 2007/0123410 A1 | 5/2007 | Morena et al. | |
| 2007/0157919 A1 | 7/2007 | Marandon | |
| 2007/0191207 A1 | 8/2007 | Danielson et al. | |
| 2007/0293388 A1 | 12/2007 | Zuyev et al. | |
| 2008/0281260 A1 | 11/2008 | William et al. | |

(Continued)

FOREIGN PATENT DOCUMENTS

CN 100519458 C 7/2009
CN 101717189 A 6/2010

(Continued)

OTHER PUBLICATIONS

International Search Report for PCT/US2012/061534 filed Oct. 24, 2012; Mail date: Jun. 26, 2013.
Varshneya, A.K., "Chemical Strengthening of Glass: Lessons Learned and yet to be Learned," International Journal of Applied Glass Science, vol. 1(2), p. 131-42 (2010).
International Search Report & Written Opinion mailed Jan. 30, 2014 for International Patent Application No. PCT/US2012/061939 filed Oct. 25, 2012. pp. 1-14.
International Search Report & Written Opinion mailed Jan. 30, 2014 for International Patent Application No. PCT/US2012/061867 filed Oct. 25, 2012. pp. 1-16.
Non-Final Office Action mailed Mar. 14, 2013, relating to U.S. Appl. No. 13/660,394, filed Oct. 25, 2012. pp. 1-7.

(Continued)

*Primary Examiner* — Anthony J Green
*Assistant Examiner* — Elizabeth A Bolden
(74) *Attorney, Agent, or Firm* — Dinsmore & Shohl LLP

(57) ABSTRACT

Alkaline earth alumino-silicate glass compositions with improved chemical and mechanical durability and pharmaceutical packages comprising the same are disclosed herein. In one embodiment a glass composition may include from about 65 mol. % to about 75 mol. % $SiO_2$; from about 6 mol. % to about 12.5 mol. % $Al_2O_3$; and from about 5 mol. % to about 12 mol. % alkali oxide. The alkali oxide may include $Na_2O$ and $K_2O$. The $K_2O$ may be present in an amount less than or equal to 0.5 mol. %. The glass composition may also include from about 8.0 mol. % to about 15 mol. % of at least one alkaline earth oxide. The glass composition is susceptible to strengthening by ion-exchange thereby facilitating chemically strengthening the glass to improve the mechanical durability.

49 Claims, 1 Drawing Sheet

(56) References Cited

U.S. PATENT DOCUMENTS

| | | |
|---|---|---|
| 2009/0163342 A1 | 6/2009 | Kolberg et al. |
| 2009/0197088 A1 | 8/2009 | Murata |
| 2009/0275462 A1 | 11/2009 | Murata |
| 2009/0325776 A1 | 12/2009 | Murata |
| 2010/0035745 A1 | 2/2010 | Murata |
| 2010/0047521 A1 | 2/2010 | Amin et al. |
| 2010/0120603 A1 | 5/2010 | Morena et al. |
| 2010/0317506 A1 | 12/2010 | Fechner et al. |
| 2011/0014475 A1 | 1/2011 | Murata |
| 2011/0017297 A1 | 1/2011 | Aitken et al. |
| 2011/0045960 A1 | 2/2011 | Fechner et al. |
| 2011/0045961 A1 | 2/2011 | Dejneka et al. |
| 2011/0062619 A1 | 3/2011 | Laine et al. |
| 2011/0071012 A1 | 3/2011 | Kondo et al. |
| 2011/0091704 A1 | 4/2011 | Akiba et al. |
| 2011/0098172 A1 | 4/2011 | Brix |
| 2011/0123832 A1 | 5/2011 | Matsumoto et al. |
| 2011/0135938 A1 | 6/2011 | Kim et al. |
| 2011/0159318 A1 | 6/2011 | Endo et al. |
| 2011/0177987 A1 | 7/2011 | Lenting et al. |
| 2011/0226658 A1 | 9/2011 | Tata-Venkata et al. |
| 2011/0274916 A1 | 11/2011 | Murata |
| 2012/0100329 A1 | 4/2012 | Baratta |
| 2012/0199203 A1 | 8/2012 | Nishizawa et al. |
| 2012/0208309 A1 | 8/2012 | Tsujimura et al. |
| 2012/0234368 A1 | 9/2012 | Cintora et al. |
| 2012/0297829 A1 | 11/2012 | Endo et al. |
| 2013/0004758 A1 | 1/2013 | Dejneka et al. |
| 2013/0011650 A1 | 1/2013 | Akiba et al. |
| 2013/0101596 A1 | 4/2013 | DeMartino et al. |
| 2013/0101764 A1 | 4/2013 | Schaut et al. |
| 2013/0101766 A1 | 4/2013 | Danielson et al. |
| 2013/0196094 A1 | 8/2013 | Weeks et al. |
| 2013/0196095 A1 | 8/2013 | Weeks et al. |
| 2013/0196096 A1 | 8/2013 | Weeks et al. |
| 2013/0196097 A1 | 8/2013 | Weeks et al. |
| 2013/0202823 A1 | 8/2013 | Weeks et al. |
| 2013/0213848 A1 | 8/2013 | Weeks et al. |
| 2013/0216742 A1 | 8/2013 | DeMartino et al. |
| 2014/0023865 A1 | 1/2014 | Comte et al. |

FOREIGN PATENT DOCUMENTS

| | | |
|---|---|---|
| CN | 102173580 A | 9/2011 |
| DE | 29702816 U1 | 4/1997 |
| DE | 102004011009 A1 | 9/2005 |
| EP | 1074521 | 11/2001 |
| EP | 2540682 A1 | 1/2013 |
| GB | 966731 A | 6/1962 |
| GB | 2335423 A | 9/1999 |
| IN | 231117 B | 3/2009 |
| JP | 7223845 A | 8/1995 |
| JP | 11314931 A | 11/1999 |
| JP | 2000007372 A | 1/2000 |
| JP | 2002025762 | 1/2001 |
| JP | 2001180969 A | 7/2001 |
| JP | 2001192239 A | 7/2001 |
| JP | 2001229526 A | 8/2001 |
| JP | 2001236634 A | 8/2001 |
| JP | 2002003241 A | 1/2002 |
| JP | 2002249340 A | 9/2002 |
| JP | 2004131314 | 4/2004 |
| JP | 2008195602 A | 8/2008 |
| JP | 2010059038 A | 3/2010 |
| KR | 630309 | 5/2006 |
| RO | 83460 | 3/1984 |
| SU | 990700 A1 | 1/1983 |
| WO | 9725932 A1 | 7/1997 |
| WO | 2007025932 | 3/2007 |
| WO | 2008050500 A1 | 5/2008 |
| WO | 2008143999 | 11/2008 |
| WO | 2009002660 A2 | 12/2008 |
| WO | 2010084670 A1 | 7/2010 |
| WO | 2011049146 | 4/2011 |
| WO | 2011069338 A1 | 6/2011 |
| WO | 2011103798 A1 | 9/2011 |
| WO | 2011103799 A1 | 9/2011 |
| WO | 2011145661 | 11/2011 |
| WO | 2012026290 A1 | 3/2012 |
| WO | 2012124757 A1 | 9/2012 |
| WO | 2013063290 A1 | 5/2013 |

OTHER PUBLICATIONS

Notice of Allowance mailed Jun. 27, 2013, relating to U.S. Appl. No. 13/660,394, filed Oct. 25, 2012. pp. 1-7.

Corrected Notice of Allowance mailed Sep. 11, 2013, relating to U.S. Appl. No. 13/660,394, filed Oct. 25, 2012. pp. 1-2.

Non-Final Office Action mailed Nov. 4, 2013, relating to U.S. Appl. No. 14/011,376, filed Aug. 27, 2013. pp. 1-11.

International Search Report & Written Opinion relating to PCT/US2013/048589 filed Jun. 28, 2013; Mail Date: Oct. 28, 2013. pp. 1-15.

Notice of Allowance mailed Mar. 11, 2014 relating to U.S. Appl. No. 14/011,376, filed Aug. 27, 2013; pp. 1-11.

Non-Final Office Action mailed May 15, 2014, relating to U.S. Appl. No. 13/660,683, filed Oct. 25, 2012. pp. 1-12.

Non-Final Office Action dated Sep. 9, 2014 relating to U.S. Appl. No. 14/057,697, filed Oct. 18, 2013. pp. 1-15.

Non-Final Office Action dated Mar. 20, 2014 relating to U.S. Appl. No. 14/057,697, filed Oct. 18, 2013. pp. 1-14.

U.S. Pharmacopeial Convention Medicines Compendium, "<660> Containers-Glass" [online], (2014). Retrieved from the Internet: <URL: https://mc.usp.org/general-chapters>. pp. 1-5.

European Pharmacopeia, 5th edition, 3.2 Containers, [online]. Retrieved from the Internet: <URL: http://pharmacyebooks.com/2009/09/european-pharmacopoeia-5-0-online.html>. pp. 1-4.

Ciullo, P.A., Industrial Minerals and Their Uses—A Handbook and Formulary. William Andrew Publishing/Noyes, (1996). ISBN: 0-8155-1408-5. Online version available at: <URL: http://app.knovel.com/hotlink/toc/id:kplMTUAHFB/industrial-minerals-their/industrial-minerals-their>. pp. 1-7.

Non-Final Office Action dated Jul. 15, 2014 relating to U.S. Appl. No. 13/660,450, filed Oct. 25, 2012. pp. 1-14.

Varshneya, A.K., "Chemical Strengthening of Glass; Lessons Learned and yet to be Learned," International Journal of Applied Glass Science, vol. 1 (2), p. 131-142 (2010).

Non-Final Office Action dated Jun. 16, 2015 relating to U.S. Appl. No. 14/701,185, filed Apr. 30, 2015. pp. 1-16.

Non-Final Office Action dated Jun. 10, 2015 relating to U.S. Appl. No. 14/272,189, filed May 7, 2014. pp. 1-22.

Non-Final Office Action dated Jun. 18, 2015 relating to U.S. Appl. No. 14/551,773, filed Nov. 24, 2014. pp. 1-15.

* cited by examiner

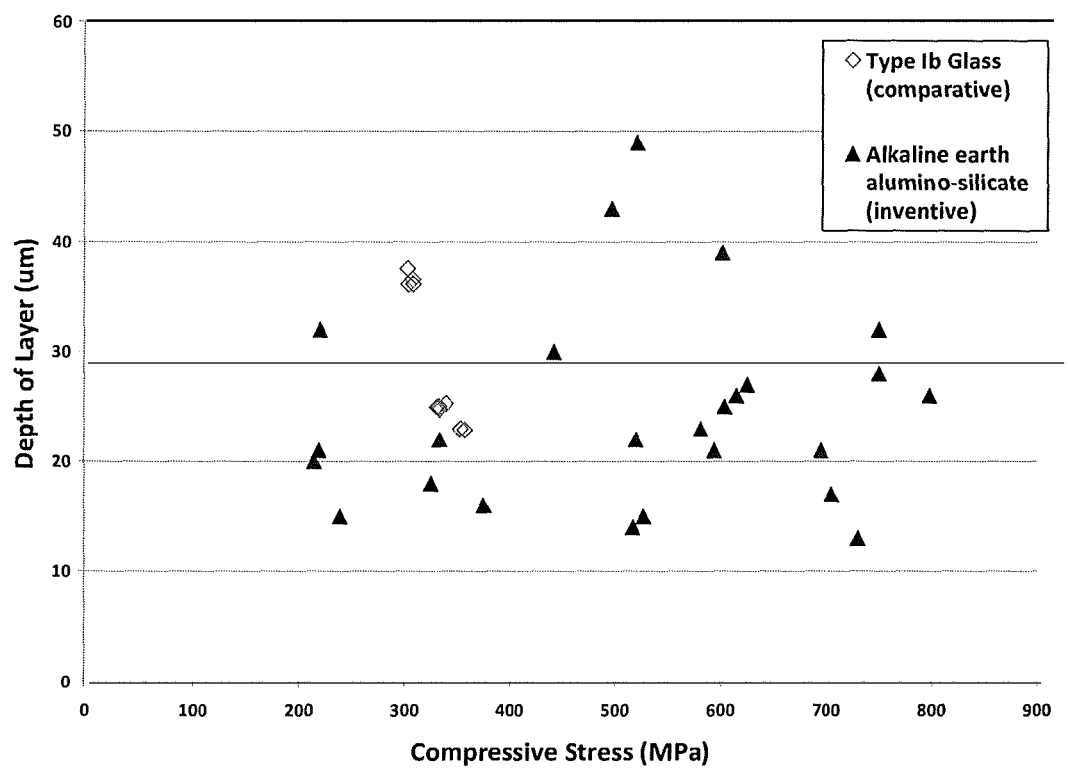

ALKALINE EARTH ALUMINO-SILICATE GLASS COMPOSITIONS WITH IMPROVED CHEMICAL AND MECHANICAL DURABILITY

CROSS REFERENCE TO RELATED APPLICATIONS

The present application claims the benefit of priority under 35 U.S.C. §119 of U.S. Provisional Patent Application Ser. No. 61/551,133 filed Oct. 25, 2011 and entitled "Alkaline Earth Alumino-Silicate Glass Compositions with Improved Chemical And Mechanical Durability," the entirety of which is incorporated by reference herein.

BACKGROUND

1. Field

The present specification generally relates to glass compositions and, more specifically, to chemically durable glass compositions which are suitable for use in pharmaceutical packaging.

2. Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as to not affect the stability of the pharmaceutical compositions contained therein. Glasses having suitable chemical durability include those glass compositions within the ASTM standard 'Type 1A' and 'Type 1B' glass compositions which have a proven history of chemical durability.

Although Type 1A and Type 1B glass compositions are commonly used in pharmaceutical packages, they do suffer from several deficiencies. Foremost is the tendency of these glasses to phase separate. Specifically, the glass tends to separate on a fine microscopic scale into an alkali borate phase and a silica rich phase. This phase separation may be a precursor to the glass flakes and de-lamination phenomena that have been reported in such glasses.

A second deficiency is that the low levels of alkali and alumina in Type 1A and Type 1B glass compositions result in only a minimal ability to ion exchange and strengthen these glasses. As a result, pharmaceutical packages made from Type 1A and 1B pharmaceutical glasses offer poor resistance to damage from mechanical events such as impacts and scratches.

Accordingly, a need exists for glass compositions which are chemically durable and susceptible to chemical strengthening by ion exchange for use in glass pharmaceutical packages and similar applications.

SUMMARY

According to one embodiment, the glass composition may include from about 65 mol. % to about 75 mol. % $SiO_2$; from about 6 mol. % to about 12.5 mol. % $Al_2O_3$; and from about 5 mol. % to about 12 mol. % alkali oxide, wherein the alkali oxide comprises $Na_2O$ and $K_2O$. The $K_2O$ may be present in an amount less than or equal to 0.5 mol. %. The glass composition may also include from about 8.0 mol. % to about 15 mol. % of at least one alkaline earth oxide. The glass composition may be susceptible to strengthening by ion-exchange.

In another embodiment, a glass composition may include from about 67 mol. % to about 75 mol. % $SiO_2$; from about 6 mol. % to about 10 mol. % $Al_2O_3$; from about 5 mol. % to about 12 mol. % alkali oxide; and from about 8 mol. % to about 15 mol. % of at least one alkaline earth oxide. The alkali oxide may include $K_2O$ in an amount less than or equal to about 0.5 mol. %. The alkaline earth oxide may include at least one of SrO and BaO. The glass composition may be free from boron and compounds of boron and phosphorous and compounds of phosphorous. The glass composition may be ion exchangeable to a depth of layer greater than or equal to about 15 μm with a corresponding compressive stress greater than or equal to about 250 MPa.

In yet another embodiment, a glass article may be formed from glass compositions including: from about 67 mol. % to about 75 mol. % $SiO_2$; from about 6 mol. % to about 10 mol. % $Al_2O_3$; from about 5 mol. % to about 12 mol. % alkali oxide; and from about 8 mol. % to about 15 mol. % of at least one alkaline earth oxide. The alkali oxide may include $Na_2O$ and $K_2O$. $K_2O$ may be present in an amount less than or equal to 0.5 mol. %. The composition may be free from boron and compounds of boron. The glass article may have at least a class S3 acid resistance according to DIN 12116; a class A1 base resistance according to ISO 695; and a type HGA1 hydrolytic resistance according to ISO 720.

In yet another embodiment, a glass article may include a compressive stress layer with a compressive stress greater than or equal to about 250 MPa and depth of layer greater than or equal to about 15 μm. The glass article may have a type HGA1 hydrolytic resistance according to ISO 720. The glass article may be formed from a glass composition which is free of boron and compounds of boron and free from phosphorous and compounds of phosphorous.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawing is included to provide a further understanding of the various embodiments, and is incorporated into and constitutes a part of this specification. The drawings illustrate the various embodiments described herein, and together with the description serve to explain the principles and operations of the claimed subject matter.

BRIEF DESCRIPTION OF THE DRAWINGS

FIG. 1 graphically depicts the ion-exchange properties (compressive stress and depth of layer) for an inventive glass composition and, for purposes of comparison, Type 1B glass compositions.

DETAILED DESCRIPTION

Reference will now be made in detail to various embodiments of glass compositions which exhibit improved chemical and mechanical durability. Such glass compositions are suitable for use in various applications including, without limitation, as pharmaceutical packaging materials. The glass compositions may also be chemically strengthened, thereby imparting increased mechanical durability to the glass. The glass compositions described herein generally comprise silica ($SiO_2$), alumina ($Al_2O_3$), alkaline earth oxides, and alkali oxides (such as $Na_2O$ and $K_2O$) in amounts which impart chemical durability to the glass composition. Moreover, the alkali oxide present in the glass compositions facilitate chemically strengthening the glass compositions by ion exchange. Various embodiments of the glass compositions will be described herein and further illustrated with reference to specific examples.

The term "softening point," as used herein, refers to the temperature at which the viscosity of the glass composition is $1 \times 10^{7.6}$ poise.

The term "annealing point," as used herein, refers to the temperature at which the viscosity of the glass composition is $1 \times 10^{13}$ poise.

The term "CTE," as used herein, refers to the coefficient of thermal expansion of the glass composition over a temperature range from about room temperature (RT) to about 300° C.

The term "chemical durability," as used herein, refers to the ability of the glass composition to resist degradation upon exposure to specified chemical conditions. Specifically, the chemical durability of the glass compositions described herein was assessed according to three established material testing standards: DIN 12116 dated March 2001 and entitled "Testing of glass—Resistance to attack by a boiling aqueous solution of hydrochloric acid—Method of test and classification;" ISO 695:1991, entitled "Glass—Resistance to attack by a boiling aqueous solution of mixed alkali—Method of test and classification"; and ISO 720:1985 entitled "Glass—Hydrolytic resistance of glass grains at 121 degrees C.—Method of test and classification." The classifications within each standard are described further herein.

The terms "free" and "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.01 mol. %.

The glass compositions described herein are alkaline earth alumino-silicate glass compositions which generally include a combination of $SiO_2$, $Al_2O_3$, at least one alkaline earth oxide, and alkali oxide including at least $Na_2O$ and $K_2O$. In some embodiments, the glass compositions may also be free from boron and compounds containing boron. The combination of these components enables a glass composition which is resistant to chemical degradation and is also suitable for chemical strengthening by ion exchange. In some embodiments, the glass compositions may further comprise minor amounts of one or more additional oxides such as, for example, $SnO_2$, $ZrO_2$, ZnO, or the like. These components may be added as fining agents and/or to further enhance the chemical durability of the glass composition.

In the embodiments of the glass compositions described herein, $SiO_2$ is the largest constituent of the composition and, as such, is the primary constituent of the glass network. $SiO_2$ enhances the chemical durability of the glass and, in particular, the resistance of the glass composition to decomposition in acid. Accordingly, a high $SiO_2$ concentration is generally desired. However, if the content of $SiO_2$ is too high, the formability of the glass may be diminished as higher concentrations of $SiO_2$ increase the difficulty of melting the glass which, in turn, adversely impacts the formability of the glass. However, additions of alkali oxide assist in offsetting this effect by decreasing the softening point of the glass. In the embodiments described herein, the glass composition generally comprises $SiO_2$ in an amount greater than or equal to about 65 mol. % and less than or equal to about 75 mol. %. In some embodiments $SiO_2$ is present in the glass composition in an amount greater than or equal to about 67 mol. % and less than or equal to about 75 mol. %. In some other embodiments, $SiO_2$ is present in the glass composition in an amount greater than or equal to about 67 mol. % and less than or equal to about 73 mol. %. In each of these embodiments, the amount of $SiO_2$ present in the glass composition may be greater than or equal to about 70 mol. % or even greater than or equal to about 72 mol. %.

The glass compositions described herein further include $Al_2O_3$. $Al_2O_3$, in conjunction with alkali oxides present in the glass compositions such as $Na_2O$ or the like, improves the susceptibility of the glass to ion exchange strengthening. Moreover, additions of $Al_2O_3$ to the composition reduce the propensity of alkali constituents (such as Na and K) from leaching out of the glass and, as such, additions of $Al_2O_3$ increase the resistance of the composition to hydrolytic degradation. Moreover, additions of $Al_2O_3$ greater than about 12.5 mol. % may also increase the softening point of the glass thereby reducing the formability of the glass. Accordingly, the glass compositions described herein generally include $Al_2O_3$ in an amount greater than or equal to about 6 mol. % and less than or equal to about 12.5 mol. %. In some embodiments, the amount of $Al_2O_3$ in the glass composition is greater than or equal to about 6 mol. % and less than or equal to about 10 mol. %. In some other embodiments, the amount of $Al_2O_3$ in the glass composition is greater than or equal to about 7 mol. % and less than or equal to about 10 mol. %.

The glass compositions also include at least two alkali oxides. The alkali oxides facilitate the ion exchangeability of the glass composition and, as such, facilitate chemically strengthening the glass. The alkali oxides also lower the softening point of the glass, thereby offsetting the increase in the softening point due to higher concentrations of $SiO_2$ in the glass composition. The alkali oxides also assist in improving the chemical durability of the glass composition. The alkali oxides are generally present in the glass composition in an amount greater than or equal to about 5 mol. % and less than or equal to about 12 mol. %. In some of these embodiments, the amount of alkali oxides may be greater than or equal to about 5 mol. % and less than or equal to about 10 mol. %. In some other embodiments, the amount of alkali oxide may be greater than or equal to about 5 mol. % and less than or equal to about 8 mol. %. In all the glass compositions described herein, the alkali oxides comprise at least $Na_2O$ and $K_2O$. In some embodiments, the alkali oxides further comprise $Li_2O$.

The ion exchangeability of the glass composition is primarily imparted to the glass composition by the amount of the alkali oxide $Na_2O$ initially present in the glass composition prior to ion exchange. Specifically, in order to achieve the desired compressive stress and depth of layer in the glass composition upon ion exchange strengthening, the glass compositions include $Na_2O$ in an amount greater than or equal to about 2.5 mol. % and less than or equal to about 10 mol. % based on the molecular weight of the glass composition. In some embodiments, the glass composition may include $Na_2O$ in an amount greater than or equal to about 3.5 mol. % and less than or equal to about 8 mol. %. In some of these embodiments, the glass composition may include $Na_2O$ in an amount greater than or equal to about 6 mol. % and less than or equal to about 8 mol. %.

As noted above, the alkali oxides in the glass composition also include $K_2O$. The amount of $K_2O$ present in the glass composition also relates to the ion exchangeability of the glass composition. Specifically, as the amount of $K_2O$ present in the glass composition increases, the compressive stress obtainable through ion exchange decreases. Accordingly, it is desirable to limit the amount of $K_2O$ present in the glass composition. In some embodiments, the amount of $K_2O$ is greater than 0 mol. % and less than or equal to about 2.5 mol. % by molecular weight of the glass composition. In some of these embodiments, the amount of $K_2O$ present in the glass composition is less than or equal to about 0.5 mol. % by molecular weight of the glass composition.

As noted above, in some embodiments, the alkali oxide in the glass composition further comprises $Li_2O$. Including $Li_2O$ in the glass composition further decreases the softening point of the glass. In embodiments where the alkali oxide includes $Li_2O$, the $Li_2O$ may be present in an amount greater than or equal to about 1 mol. % and less than or equal to about 3 mol. %. In some embodiments, $Li_2O$ may be present in the glass composition in an amount which is greater than about 2 mol. % and less than or equal to about 3 mol. %. However, in some other embodiments, the glass composition may be substantially free of lithium and compounds containing lithium.

The alkaline earth oxides present in the composition improve the meltability of the glass batch materials and increase the chemical durability of the glass composition. The presence of alkaline earth oxides in the glass composition also reduce the susceptibility of the glass to de-lamination. In the glass compositions described herein, the glass compositions generally include at least one alkaline earth oxide in a concentration greater than or equal to about 8 mol. % or even 8.5 mol. % and less than or equal to about 15 mol. %. In some embodiments, the glass composition may comprise from about 9 mol. % to about 15 mol. % of alkaline earth oxide. In some of these embodiments, the amount of alkaline earth oxide in the glass composition may be from about 10 mol. % to about 14 mol. %.

The alkaline earth oxide in the glass composition may include MgO, CaO, SrO, BaO or combinations thereof. For example, in the embodiments described herein the alkaline earth oxide may include MgO. In some embodiments, MgO may be present in the glass composition in an amount which is greater than or equal to about 2 mol. % and less than or equal to about 7 mol. % by molecular weight of the glass composition, or even greater than or equal to about 3 mol. % and less than or equal to about 5 mol. % by molecular weight of the glass composition.

In some other embodiments, the concentration of MgO in the glass composition may be reduced in order to lower the liquidus temperature of the glass composition and increase the liquidus viscosity, both of which improve the formability of the glass composition. For example, in some embodiments, the concentration of MgO may be greater than 0 mol. % and less than or equal to about 3.5 mol. %. In some other embodiments, the concentration of MgO may be greater than 0 mol. % and less than or equal to about 3.0 mol. % or even less than or equal to 2.5 mol. %.

In some embodiments, the alkaline earth oxide also includes CaO. In these embodiments, CaO is present in the glass composition in an amount from about 2 mol. % to less than or equal to 7 mol. % by molecular weight of the glass composition. In some embodiments, CaO is present in the glass composition in an amount from about 3 mol. % to less than or equal to 7 mol. % by molecular weight of the glass composition. In some of these embodiments, CaO may be present in the glass composition in an amount greater than or equal to about 4 mol. % and less than or equal to about 7 mol. %. In some other embodiments, CaO may be present in the glass composition in an amount greater than or equal to about 5 mol. % and less than or equal to about 6 mol. %, such as when CaO is substituted for MgO in the alkaline earth oxide to decrease the liquidus temperature and increase the liquidus viscosity. In still other embodiments, CaO may be present in the glass in an amount greater than or equal to about 2 mol. % and less than or equal to about 5 mol. %, such as when SrO is substituted for MgO in the alkaline earth oxide to decrease the liquidus temperature and increase the liquidus viscosity.

In some embodiments described herein, the alkaline earth oxide further comprises at least one of SrO or BaO. The inclusion of SrO reduces the liquidus temperature of the glass composition and, as a result, improves the formability of the glass composition. In some embodiments the glass composition may include SrO in an amount greater than 0 mol. % and less than or equal to about 6.0 mol. %. In some other embodiments, the glass composition may include SrO in an amount greater than about 0 mol. % and less than or equal to about 5 mol. %. In some of these embodiments, the glass composition may include greater than or equal to about 2 mol. % and less than or equal to about 4 mol. % SrO, such as when CaO is substituted for MgO in the alkaline earth oxide to decrease the liquidus temperature and increase the liquidus viscosity. In some other embodiments, the glass composition may include from about 1 mol. % to about 2 mol. % SrO. In still other embodiments, SrO may be present in the glass composition in an amount greater than or equal to about 3 mol. % and less than or equal to about 6 mol. %, such as when SrO is substituted for MgO in the alkaline earth oxide to decrease the liquidus temperature and increase the liquidus viscosity.

In embodiments where the glass composition includes BaO, the BaO may be present in an amount greater than about 0 mol. % and less than about 2 mol. %. In some of these embodiments, BaO may be present in the glass composition in an amount less than or equal to about 1.5 mol. % or even less than or equal to about 0.5 mol. %. However, in some other embodiments, the glass composition is substantially free from barium and compounds of barium.

In the embodiments of the glass compositions described herein, the glass compositions generally contain less than about 1 mol. % of boron or oxides of boron, such as $B_2O_3$. For example, in some embodiments the glass compositions may comprise greater than or equal to about 0 mol. % $B_2O_3$ and less than or equal to 1 mol. % $B_2O_3$. In some other embodiments, the glass compositions may comprise greater than or equal to about 0 mol. % $B_2O_3$ and less than or equal to 0.6 mol. % $B_2O_3$. In still other embodiments, the glass compositions are substantially free from boron and compounds of boron such as $B_2O_3$. Specifically, it has been determined that forming the glass composition with a relatively low amount of boron or compounds of boron (i.e., less than or equal to 1 mol. %) or without boron or compounds of boron significantly increases the chemical durability of the glass composition. In addition, it has also been determined that forming the glass composition with a relatively low amount of boron or compounds of boron or without boron or compounds of boron improves the ion exchangeability of the glass compositions by reducing the process time and/or temperature required to achieve a specific value of compressive stress and/or depth of layer.

In some embodiments of the glass compositions described herein, the glass compositions are substantially free from phosphorous and compounds containing phosphorous including, without limitation, $P_2O_5$. Specifically, it has been determined that formulating the glass composition without phosphorous or compounds of phosphorous increases the chemical durability of the glass composition.

In addition to the $SiO_2$, $Al_2O_3$, alkali oxides and alkaline earth oxides, the glass compositions described herein may optionally further comprise one or more fining agents such as, for example, $SnO_2$, $As_2O_3$, and/or $Cl^-$ (from NaCl or the like). When a fining agent is present in the glass composition, the fining agent may be present in an amount less than or equal to about 1 mol. % or even less than or equal to about 0.5 mol. %. For example, in some embodiments the glass composition may include $SnO_2$ as a fining agent. In these embodiments $SnO_2$ may be present in the glass composition in an amount greater than about 0 mol. % and less than or equal to about 0.30 mol. %.

Moreover, the glass compositions described herein may comprise one or more additional metal oxides to further improve the chemical durability of the glass composition. For example, the glass composition may further include ZnO or $ZrO_2$, each of which further improves the resistance of the glass composition to chemical attack. In these embodiments, the additional metal oxide may be present in an amount which is greater than or equal to about 0 mol. % and less than or equal to about 2.0 mol. %. For example, when the additional metal oxide is $ZrO_2$, the $ZrO_2$ may be present in an amount less than or equal to about 1.5 mol. %. Alternatively or additionally, the additional metal oxide may include ZnO in an amount less than or equal to about 2.0 mol. %. In some embodiments, ZnO may be included as a substitute for one or more of the alkaline earth oxides. For example, in embodiments where the glass composition includes the alkaline earth oxides MgO, CaO and SrO, the amount of MgO may be reduced to decrease the liquidus temperature and increase the liquidus viscosity, as described above. In these embodiments, ZnO may be added to the glass composition as a partial substitute for MgO, in addition to or in place of at least one of CaO or SrO.

In a first exemplary embodiment, the glass composition may include from about 65 mol. % to about 75 mol. % $SiO_2$; from about 6 mol. % to about 12.5 mol. % $Al_2O_3$; and from about 5 mol. % to about 12 mol. % alkali oxide, wherein the alkali oxide comprises $Na_2O$ and $K_2O$. The $K_2O$ may be present in an amount less than or equal to 0.5 mol. %. The glass composition may also include from about 8.0 mol. % to about 15 mol. % of alkaline earth oxide. The glass composition may be susceptible to strengthening by ion-exchange.

In this first exemplary embodiment, the $SiO_2$ may be present in the glass composition in a concentration from about 67 mol. % to about 75 mol. %. The $Al_2O_3$ may be present in the glass composition in a concentration from about 6 mol. % to about 10 mol. %. In some embodiments, the concentration of $Al_2O_3$ may be greater than about 7 mol. %.

In this first exemplary embodiment, the glass composition may include less than about 1 mol. % $B_2O_3$. Alternatively, the glass composition may be free from boron and compounds of boron.

The alkaline earth oxide of this first exemplary embodiment may include at least one of SrO and BaO. When SrO is present, the amount of SrO may be greater than or equal to about 1 mol. % and less than or equal to about 2 mol. %. Alternatively, the amount of SrO may be greater than 0 mol. % and less than or equal to about 6 mol. %.

The glass composition of this first exemplary embodiment may be free from barium and compounds of barium.

The alkali metal oxide in the glass composition of this first exemplary embodiment may further comprise $Li_2O$ in an amount from about 1 mol. % to about 3 mol. %. The concentration of the alkali oxide $Na_2O$ in this first exemplary embodiment may be from about 3.5 mol. % to about 8 mol. %.

The alkaline earth oxide in the glass composition of this first exemplary embodiment may be present in an amount from about 10 mol. % to about 14 mol. %. The alkaline earth oxide may include MgO and CaO. When MgO is present, the MgO may have a concentration greater than 0 mol. % and less than or equal to 3.5 mol. %.

The glass compositions of this first exemplary embodiment may further include $ZrO_2$ in an amount less than or equal to about 1.5 mol. % and/or ZnO in an amount less than or equal to about 2.0 mol. %. $SnO_2$ may also be added to the glass compositions of this first embodiment in an amount less than or equal to about 0.3 mol. %. The glass composition may also be substantially free from phosphorous and compounds of phosphorous.

The glass composition of the first exemplary embodiment may also have a ratio of MgO to the sum of the concentrations of the divalent cations (ΣRO) (MgO:ΣRO) of less than 0.3. Divalent cations RO include the alkaline earth oxides (e.g., MgO, CaO, SrO, BaO), ZnO, and the like.

The glass compositions of this first exemplary embodiment may have at least a class S3 acid resistance according to DIN 12116 both before and after ion-exchange strengthening; a class A1 base resistance according to ISO 695 both before and after ion-exchange strengthening; and/or a type HGA1 hydrolytic resistance according to ISO 720 before and/or after ion exchange strengthening.

In a second exemplary embodiment, a glass composition may include from about 67 mol. % to about 75 mol. % $SiO_2$; from about 6 mol. % to about 10 mol. % $Al_2O_3$; from about 5 mol. % to about 12 mol. % alkali oxide; and from about 8 mol. % to about 15 mol. % of alkaline earth oxide. The alkali oxide may include $K_2O$ in an amount less than or equal to about 0.5 mol. %. The alkaline earth oxide may include at least one of SrO and BaO. The glass composition may be free from boron and compounds of boron and phosphorous and compounds of phosphorous. The glass composition may be ion exchangeable to a depth of layer greater than or equal to about 15 μm with a corresponding compressive stress greater than or equal to about 250 MPa.

The glass composition of this second exemplary embodiment may further comprise SrO. When SrO is present, the amount of SrO may be greater than or equal to about 1 mol. % and less than or equal to about 2 mol. %. Alternatively, the amount of SrO may be greater than 0 mol. % and less than or equal to about 6 mol. %.

The glass composition of this second exemplary embodiment may be free from barium and/or compounds of barium.

The alkali metal oxide in the glass composition of this second exemplary embodiment may further comprise $Li_2O$ in an amount from about 1 mol. % to about 3 mol. %. The concentration of $Na_2O$ in the glass composition of this first exemplary embodiment may be from about 3.5 mol. % to about 8 mol. %.

The concentration of $Al_2O_3$ in the glass composition of this second embodiment may be greater than or equal to about 7 mol. %.

The alkaline earth oxide in the glass composition of this second exemplary embodiment may be present in an amount from about 10 mol. % to about 14 mol. %. The alkaline earth oxide may include MgO and CaO. When MgO is present, the MgO may have a concentration greater than 0 mol. % and less than or equal to 3.5 mol. %. In this second exemplary embodiment, the alkaline earth oxide may include from about 5 mol. % to about 6 mol. % CaO and from about 2 mol. % to about 4 mol. % SrO.

In this second exemplary embodiment, the glass composition may further include $Li_2O$ in an amount greater than or equal to 1 mol. % and less than or equal to 3 mol. %. Alternatively, the glass composition may be free from lithium and compounds containing lithium. The glass composition may also include ZnO in an amount less than or equal to about 2.0 mol. %. Alternatively, the glass composition may be free from zinc and compounds containing zinc.

The glass composition of this second exemplary embodiment may include $ZrO_2$ in an amount less than or equal to about 1.5 mol. %.

The glass composition of the second exemplary embodiment may also have a ratio MgO:ΣRO which is less than 0.3.

The glass composition of this second exemplary embodiment may have at least a class S3 acid resistance according to DIN 12116 both before and after ion-exchange strengthening; a class A1 base resistance according to ISO 695 both before and after ion-exchange strengthening; and/or a type HGA1 hydrolytic resistance according to ISO 720 before and/or after ion exchange strengthening.

In a third exemplary embodiment, a glass article may be formed from the glass composition of exemplary embodiment one or exemplary embodiment two. In this third exemplary embodiment, the glass article may be ion exchange strengthened such that the glass article has a compressive stress greater than or equal to about 250 MPa and a depth of layer greater than or equal to about 15 µm. The glass article may also have a coefficient of thermal expansion less than or equal to $70 \times 10^{-7} K^{-1}$.

In a fourth exemplary embodiment, a glass article may include a compressive stress layer with a compressive stress greater than or equal to about 250 MPa and depth of layer greater than or equal to about 15 µm. The glass article may have a type HGA1 hydrolytic resistance according to ISO 720. The glass article may be formed from a glass composition which is free of boron and compounds of boron and free from phosphorous and compounds of phosphorous.

In this fourth exemplary embodiment, the glass article may have a class S1 base resistance according to ISO 695. The glass article may also have least a class S3 acid resistance according to DIN 2116.

The glass article of this fourth exemplary embodiment may be formed from a glass composition which includes from about 67 mol. % to about 75 mol. % $SiO_2$; from about 6 mol. % to about 10 mol. % $Al_2O_3$; from about 5 mol. % to about 12 mol. % alkali oxide; and from about 8.0 mol. % to about 15 mol. % of alkaline earth oxide. The alkali oxide may include $Na_2O$ and $K_2O$. The $K_2O$ may be present in an amount less than or equal to 0.5 mol. %. A ratio MgO:ΣRO in the glass composition is less than 0.3.

In the embodiments described herein, the glass compositions generally have softening points of less than about 1040° C. or even less than about 950° C. In some embodiments, the softening point of the glass composition is less than about 900° C. These lower softening points improve the ease of formability of the glass composition.

In some embodiments described herein, the glass compositions have a liquidus viscosity which is greater than or equal to 85 kP or even greater than or equal to about 90 kP. In some embodiments, the glass compositions have liquidus viscosities of greater than 150 kP or even greater than or equal to 200 kP. Such liquidus viscosities can be obtained by decreasing the concentration of MgO in the glass composition and increasing the concentration of one or more of CaO, SrO and ZnO in substitution. Glass compositions with liquidus viscosities as described above are generally suitable for forming 3-dimensional glass shapes, such as glass tubing.

More specifically, in order to provide a glass composition which is readily formable into 3-dimensional shapes, the molten glass formed from the compositions should generally have a liquidus viscosity of greater than or equal to 90 kilopoise (kP). It has been determined that glass compositions with liquidus viscosities of greater than 90 kP can be obtained by controlling the ratio of MgO to the sum of the concentrations of the divalent cations (ΣRO). Divalent cations include the alkaline earth oxides (e.g., MgO, CaO, SrO, BaO), ZnO, and the like. Specifically, it has been determined that when MgO:ΣRO is less than 0.30, the glass compositions generally have a liquidus viscosity of greater than or equal to 90 kP, preferably greater than or equal to 100 kP or even greater than or equal to 115 kP. Accordingly, in some embodiments described herein, the ratio MgO:ΣRO is less than 0.3.

In the embodiments described herein the glass compositions have a CTE of less than about $70 \times 10^{-7} K^{-1}$ or even less than about $60 \times 10^{-7} K^{-1}$. These lower CTE values improve the survivability of the glass to thermal cycling or thermal stress conditions relative to glass compositions with higher CTEs.

As noted above, the presence of alkali oxides in the glass composition facilitates chemically strengthening the glass by ion exchange. By varying the concentration of alkali oxides in the glass, specifically the concentration of $Na_2O$ in the glass, a wide range of compressive stresses and depth of layer values are possible for various ion-exchange processing conditions. Glass articles formed from the glass compositions described herein may have compressive stresses greater than or equal to about 200 MPa or even 250 MPa following ion-exchange strengthening. For example, in some embodiments the compressive stress may be from about 200 MPa to about 850 MPa. In some other embodiments, the compressive stress may be from about 500 MPa to about 700 MPa. It should be understood that the phrase "compressive stress," as used herein, refers to the compressive stress in the glass at the surface of the glass. The glass compositions described herein may be ion-exchange strengthened to achieve depth of layers greater than or equal to about 15 µm, such as from about 15 µM to about 50 µm. For example, in some embodiments, the depth of layer may be greater than or equal to about 25 µm and less than or equal to about 30 µm. The above referenced compressive stresses and depth of layers may be obtained in some glass compositions described herein after the glass composition is treated in a salt bath of 100% molten $KNO_3$ at a temperatures from about 400° C. to about 500° C. for a time period of less than about 30 hours or even less than about 20 hours.

As graphically illustrated in FIG. 1, the glass compositions described herein can be chemically strengthened by ion exchange. Exemplary depths of layer and the corresponding compressive stress are graphically depicted in FIG. 1. Also, for purposes of comparison, the depth of layer and compressive stress obtainable for Type 1B glass are also depicted. As shown in FIG. 1, the glass compositions described herein may be ion exchanged to achieve a much greater compressive stress and depth of layer than Type 1B glass.

Further, as noted hereinabove, the glass compositions are chemically durable and resistant to degradation as determined by the DIN 12116 standard, the ISO 695 standard, and the ISO 720 standard.

Specifically, the DIN 12116 standard is a measure of the resistance of the glass to decomposition when placed in an acidic solution. In brief, the DIN 12116 standard utilizes a polished glass sample of a known surface area which is weighed and then positioned in contact with a proportional amount of boiling 6M hydrochloric acid for 6 hours. The sample is then removed from the solution, dried and weighed again. The glass mass lost during exposure to the acidic solution is a measure of the acid durability of the sample with smaller numbers indicative of greater durability. The results of the test are reported in units of mass per surface area, specifically $mg/dm^2$. The DIN 12116 standard is broken into individual classes. Class S1 indicates a half weight loss of up to 0.7 $mg/dm^2$; Class S2 indicates a half weight loss from 0.7 $mg/dm^2$ up to 1.5 $mg/dm^2$; Class S3 indicates a half weight loss from 1.5 mg/dm² up to 15 mg/dm²; and Class S4 indicates a half weight loss of more than 15 mg/dm².

The ISO 695 standard is a measure of the resistance of the glass to decomposition when placed in a basic solution. In brief, the ISO 695 standard utilizes a polished glass sample which is weighed and then placed in a solution of boiling 1M NaOH+0.5M Na₂CO₃ for 3 hours. The sample is then removed from the solution, dried and weighed again. The glass mass lost during exposure to the basic solution is a measure of the base durability of the sample with smaller numbers indicative of greater durability. As with the DIN 12116 standard, the results of the ISO 695 standard are reported in units of mass per surface area, specifically mg/dm². The ISO 695 standard is broken into individual classes. Class A1 indicates weight losses of up to 75 mg/dm²; Class A2 indicates weight losses from 75 mg/dm² up to 175 mg/dm²; and Class A3 indicates weight losses of more than 175 mg/dm².

The ISO 720 standard is a measure of the resistance of the glass to degradation in distilled water. In brief, the ISO 720 standard protocol utilizes crushed grass grains which are placed in contact with 18 MΩ water under autoclave conditions (121° C., 2 atm) for 30 minutes. The solution is then titrated colorimetrically with dilute HCl to neutral pH. The amount of HCL required to titrate to a neutral solution is then converted to an equivalent of Na₂O extracted from the glass and reported in μg of glass with smaller values indicative of greater durability. The ISO 720 standard is broken into individual types. Type HGA1 is indicative of up to 62 μg extracted equivalent of Na₂O; Type HGA2 is indicative of more than 62 μg and up to 527 μg extracted equivalent of Na₂O; and Type HGA3 is indicative of more than 527 μg and up to 930 μg extracted equivalent of Na₂O.

The glass compositions described herein have an acid resistance of at least class S3 according to DIN 12116 with some embodiments having an acid resistance of at least class S2 or even class S1. Further, the glass compositions described herein have a base resistance according to ISO 695 of at least class A2 with some embodiments having a class A1 base resistance. The glass compositions described herein also have a ISO 720 type HGA2 hydrolytic resistance with some embodiments having a type HGA1 hydrolytic resistance. It should be understood that, when referring to the above referenced classifications according to DIN 12116, ISO 695 and ISO 720, a glass composition or glass article which has "at least" a specified classification means that the performance of the glass composition is as good as or better than the specified classification. For example, a glass article which has a DIN 12116 acid resistance of "at least class S2" may have a DIN 12116 classification of either S1 or S2.

The glass compositions described herein are formed by mixing a batch of glass raw materials (e.g., powders of SiO₂, Al₂O₃, alkali carbonates, alkaline earth carbonates and the like) such that the batch of glass raw materials has the desired composition. Thereafter, the batch of glass raw materials is heated to form a molten glass composition which is subsequently cooled and solidified to form the glass composition. During solidification (i.e., when the glass composition is plastically deformable) the glass composition may be shaped using standard forming techniques to shape the glass composition into a desired final form. Alternatively, the glass article may be shaped into a stock form, such as a sheet, tube or the like, and subsequently reheated and formed into the desired final form.

The glass compositions described herein may be shaped into glass articles having various shape forms including, without limitation, sheets, tubes or the like, which can then be reshaped into other glass articles such as bottles, glass containers, etc. Given the chemical durability of the glass composition, the glass compositions described herein are particularly well suited for use in the formation of pharmaceutical packages for containing a pharmaceutical composition, such as liquids, powders and the like. For example, the glass compositions described herein may be used to form vials, ampoules, cartridges, syringe bodies and/or any other glass container for storing pharmaceutical compositions. Moreover, the ability to chemically strengthen the glass compositions through ion exchange can be utilized to improve the mechanical durability of such pharmaceutical packaging. Accordingly, it should be understood that, in at least one embodiment, the glass compositions are incorporated in a pharmaceutical package in order to improve the chemical durability and/or the mechanical durability of the pharmaceutical packaging.

Examples

The embodiments of glass compositions described herein will be further clarified by the following examples.

Table 1 below contains the composition of Comparative Examples 1-3 and Inventive Examples A-D. The softening point, CTE, and chemical durability of each composition are also listed. Specifically, Comparative Examples 1-3 contained B₂O₃. Removing B₂O₃ from the glass composition to improve the chemical durability typically results in a corresponding undesirable increase in the softening point of the glass. In order to counteract this trend in the glass compositions listed in Table 1, B₂O₃ was replaced with alkali oxide, SiO₂, ZrO₂ or combinations thereof. The SiO₂ and ZrO₂ improve the chemical durability of the glass. Additions of alkali oxide lowered the softening point of the glass by as much as 80° C.

TABLE 1

Comparative Examples 1-3 and Inventive Examples A-D

| (Mol %) | Comp. Ex. 1 | Comp. Ex. 2 | Comp. Ex. 3 | Ex. A | Ex. B | Ex. C | Ex. D |
|---|---|---|---|---|---|---|---|
| SiO₂ | 70.8 | 69.9 | 69.3 | 68.3 | 68.6 | 67.7 | 70.8 |
| Al₂O₃ | 12.4 | 12.4 | 12.4 | 9 | 9.3 | 10.2 | 7.1 |
| B₂O₃ | 1.2 | 0.6 | 1.2 | 0.6 | 0 | 0 | 0 |
| Na₂O | 0 | 0 | 0 | 2.5 | 2.5 | 2.5 | 2.5 |
| K₂O | 0 | 0 | 0 | 2.5 | 2.5 | 2.5 | 2.5 |
| MgO | 5.1 | 5.1 | 5.1 | 5.1 | 5.1 | 5.1 | 5.1 |
| CaO | 5.3 | 5.3 | 5.3 | 5.3 | 5.3 | 5.3 | 5.3 |
| SrO | 1.4 | 3.8 | 3.8 | 3.8 | 3.8 | 3.8 | 3.8 |
| BaO | 3.8 | 1.4 | 1.4 | 1.4 | 1.4 | 1.4 | 1.4 |

TABLE 1-continued

Comparative Examples 1-3 and Inventive Examples A-D

| (Mol %) | Comp. Ex. 1 | Comp. Ex. 2 | Comp. Ex. 3 | Ex. A | Ex. B | Ex. C | Ex. D |
|---|---|---|---|---|---|---|---|
| $ZrO_2$ | 0 | 1.5 | 1.5 | 1.5 | 1.5 | 1.5 | 1.5 |
| $SnO_2$ | 0.3 | 0.3 | 0.3 | 0.3 | 0.3 | 0.3 | 0.3 |
| Soft pt. (° C.) | 1034 | 1031 | 1030 | 952 | 963 | 967 | 953 |
| CTE ($\times 10^{-7} K^{-1}$) | 40 | 37 | 37 | 48 | 56 | 56 | 56 |
| DIN-12116 | 4.33 | 4.44 | 5.29 | 5.38 | 5.11 | 8.59 | 2.12 |
| ISO-695 | 64.4 | 25.4 | 27.2 | 26.1 | 22.8 | 30.0 | 24.1 |

Table 2 shows the composition and properties of inventive Examples E-J. Specifically, the composition of inventive Examples E-J were used to assess the efficacy of further additions of alkali oxide ($Na_2O$, $K_2O$, $Li_2O$) on chemical durability of the glass as well as ion exchange performance. As shown in Table 2, alkali oxide additions as high as 11.5 mol. % were examined, with slight increases in $SiO_2$ content to maintain acid durability. The softening points of these glass compositions decreased to as low as 870° C. due to the increase in alkali oxide content. Moreover, neither the acid nor base resistances of these glass compositions were adversely impacted by the higher alkali level, with all glasses falling into either the S2 or S3 DIN 12116 classification and the A1 ISO 695 classification.

The ion exchangeability of inventive Examples E-J were also investigated. Specifically, samples of the glass compositions of inventive Examples E-J were ion exchanged in a molten salt bath of 100% $KNO_3$ for 15 hours at temperatures of 430° C., 440° C., and 475° C. Thereafter, the surface compression and depth of layer were determined. In the examples discussed herein, the compressive stress and DOL values are measured values obtained with an FSM instrument, with the compressive stress value based on the measured stress optical coefficient (SOC). The chemical durability of the samples was also determined following ion exchange. The results are reported in Table 3 below.

Table 3 shows that the ion exchangeability of the glass compositions is strongly dependent on the amount of alkali oxide in the composition. Compressive stress values of 200-350 MPa were reached in glass compositions with alkali oxide levels of 5 mol. % to 6 mol. %. Compressive stress values of 700-825 MPa were reached in glass compositions with alkali oxide levels of 8.5 mol. % to 11.5 mol. %. Example H had a compressive stress of 817 MPa with a depth of layer of 48 microns after ion exchange for 15 hours at 440° C., values which are comparable to commercially available ion-exchanged damage-tolerant glass.

TABLE 2

Compositions and Properties of Inventive Examples E-J

| (Mol %) | Ex. E | Ex. F | Ex. G | Ex. H | Ex. I | Ex. J |
|---|---|---|---|---|---|---|
| $SiO_2$ | 70.8 | 72.3 | 72.3 | 71.7 | 71.7 | 71.7 |
| $Al_2O_3$ | 7.1 | 7.1 | 7.1 | 7.4 | 7.04 | 7.4 |
| $Li_2O$ | 0 | 0 | 1 | 0 | 1 | 1 |
| $Na_2O$ | 2.5 | 2.5 | 2.5 | 10 | 7 | 10 |
| $K_2O$ | 2.5 | 2.5 | 2.5 | 0.5 | 0.5 | 0.5 |
| MgO | 5.1 | 5.1 | 4.1 | 5.1 | 5.1 | 5.1 |
| CaO | 5.3 | 5.3 | 5.3 | 4.3 | 5.3 | 4.3 |
| SrO | 3.8 | 3.8 | 3.8 | 0.5 | 2 | 0 |
| BaO | 1.4 | 1.4 | 1.4 | 0.5 | 0 | 0 |
| $ZrO_2$ | 1.5 | 0 | 0 | 0 | 0 | 0 |
| $SnO_2$ | 0.3 | 0.3 | 0.3 | 0.3 | 0.3 | 0.3 |
| Total Alkali | 5.0 | 5.0 | 6.0 (incl. 1% $Li_2O$) | 10.5 | 8.5 (incl. 1% $Li_2O$) | 11.5 (incl. 1% $Li_2O$) |
| Anneal pt (° C.) | 721 | 707 | 660 | 642 | 638 | 637 |
| Soft pt. (° C.) | 954 | 942 | 900 | 873 | 869 | 869 |
| CTE ($\times 10^{-7} K^{-1}$) | 56.4 | 57.4 | 59.2 | 69.0 | 62.9 | 70.4 |
| DIN-12116 | 2.73 | 1.74 | 1.66 | 1.73 | 1.49 | 1.50 |
| ISO-695 | 20.5 | 41.9 | 52.7 | 69.9 | 57.7 | 45.5 |

Table 3 also shows that ion exchange treatment has minimal effect on chemical durability with the exception of the acid durability of several of the glasses with higher compressive stress values. In these instances, the glass mass lost following testing increased by a factor of 20 to 200 compared to corresponding non-ion exchanged glass compositions. While not wishing to be bound by theory, this result may be more of a manifestation of chipping of the glass edge during testing due to high compressive stress rather than actual decreased chemical resistance from ion exchange.

TABLE 3

Ion Exchange Properties of Examples E-J

| | Ex. E | Ex. F | Ex. G | Ex. H | Ex. I | Ex. J |
|---|---|---|---|---|---|---|
| Total Alkali (mol. %) | 5.0 | 5.0 | 6.0 (incl. 1% $Li_2O$) | 10.5 | 8.5 (incl. 1% $Li_2O$) | 11.5 (incl. 1% $Li_2O$) |

TABLE 3-continued

Ion Exchange Properties of Examples E-J

|  | Ex. E | Ex. F | Ex. G | Ex. H | Ex. I | Ex. J |
| --- | --- | --- | --- | --- | --- | --- |
| IX 430°-15 hr, 100% $KNO_3$ | 233 MPa, 13 μm | 214 MPa, 20 μm | 325 MPa, 18 μm | 750 MPa, 28 μm | 705 MPa, 17 μm | 800 MPa, 26 μm |
| IX 475°-15 hr, 100% $KNO_3$ | 239 MPa, 15 μm | 219 MPa, 21 μm | 333 MPa, 22 μm | 750 MPa, 32 μm | 695 MPa, 21 μm | — |
| IX 440°-15 hr, 100% $KNO_3$ | — | 220 MPa, 32 μm | — | 817 MPa, 48 μm | — | — |
| DIN-12116 (IX) | 2.74 | 2.32 | 30.7 | 52.5 | 538 | 743 |
| Repeat | 1.31 | 1.01 | 3.68 | 94.3 | 58.9 | 55.6 |
| With pre-boil | 1.39 | 1.17 | 2.59 | 80.7 | 42.0 | 57.3 |
| ISO-695 (IX) | 19.08 | 48.86 | 44.78 | 79.45 | 64.54 | 42.91 |

Table 4 contains the composition and properties of several inventive examples of alkaline earth alumino-silicate glass compositions with intermediate amounts of alkali oxides (i.e., from about 5 mol. % to about 10.5 mol. %). Each of the samples exhibited an acid resistance of at least class S3 according to the DIN 12116 standard. Each of the samples also exhibited a base resistance of class A1 according to the ISO 695 standard. Test data for the ISO 720 standard was not available. The softening point of these glass compositions was in the range of 830-940° C.

Further, the glass compositions of inventive Examples K-R had compressive stress values in the range of 350-600 MPa and depth of layers up to about 50 μm.

Furthermore, Examples S-X each exhibited an ISO 720 hydrolytic resistance of HGA1 after ion exchange (IX) with Example U exhibiting an ISO 720 hydrolytic resistance of HGA1 both before (NIX) and after ion exchange.

TABLE 4

Composition and Properties of Examples K-R

| (Mol %) | Ex. K | Ex. L | Ex. M | Ex. N | Ex. O | Ex. P | Ex. Q | Ex. R |
| --- | --- | --- | --- | --- | --- | --- | --- | --- |
| $SiO_2$ | 72.3 | 72.3 | 72.3 | 72.3 | 71.7 | 72.2 | 71.7 | 71.7 |
| $Al_2O_3$ | 7.1 | 7.1 | 7.1 | 7.4 | 7.4 | 7.4 | 7.4 | 7.4 |
| $Li_2O$ | 0 | 0 | 0 | 0 | 0 | 0 | 3 | 1 |
| $Na_2O$ | 2.5 | 4.5 | 5.9 | 7.7 | 7.4 | 10 | 5 | 7.2 |
| $K_2O$ | 2.5 | 0.5 | 0.5 | 0.5 | 0.5 | 0.5 | 0.5 | 0.5 |
| MgO | 5.1 | 5.1 | 5.1 | 6.8 | 6.5 | 5.1 | 5.1 | 9.1 |
| CaO | 5.3 | 5.3 | 5.3 | 4.3 | 5.5 | 4.3 | 5.3 | 3.3 |
| SrO | 3.8 | 3.8 | 3.8 | 0.5 | 1 | 0.5 | 2 | 0 |
| BaO | 1.4 | 1.4 | 0 | 0.5 | 0 | 0 | 0 | 0 |
| $SnO_2$ | 0.3 | 0.3 | 0.3 | 0.3 | 0.3 | 0.3 | 0.3 | .3 |
| Strain Pt. (° C.) | 604 | 631 | 628 | 632 | 636 | 635 | 562 | — |
| Anneal Pt. (° C.) | 653 | 680 | 678 | 682 | 686 | 687 | 609 | — |
| Soft Pt. (° C.) | 887 | 910 | 913 | 911 | 916 | 940 | 834 | — |
| CTE ($\times 10^{-7} K^{-1}$) | 67.5 | 61.6 | 61.1 | 59.5 | 57.3 | 58.3 | 60.9 | — |
| DIN-12116 | — | 1.94 | 1.71 | 1.43 | 1.62 | — | — | — |
| ISO-695 | — | 52.3 | 16.6 | 52.7 | 51.6 | — | — | — |
| ISO-720 | — | — | — | — | — | — | — | — |
| IX 440°-15 hr, 100% $KNO_3$ | — | 600 MPa, 25 μm | 610 MPa, 25 μm | 522 MPa, 15 μm | — | — | 730 MPa, 13 μm | — |
| IX 475°-15 hr, 100% $KNO_3$ | — | 590 MPa, 37 μm | 600 MPa 40 μm | 520 MPa 22 μm | 424 MPa 12 μm | — | — | — |
| IX 490°-15 hr, 100% $KNO_3$ | — | 497 MPa, 43 μm | 521 MPa 49 μm | 442 MPa 30 μm | 375 MPa 16 μm | — | — | — |

Table 5 contains the composition and properties of several inventive examples of alkaline earth alumino-silicate glass compositions which include alkaline earth oxides with reduced amounts of MgO. Specifically, in Examples S-X, MgO in the alkaline earth oxide was replaced with CaO and, in one example, CaO and ZnO, in order to decrease the liquidus temperature and increase the liquidus viscosity of the glass, thereby improving formability. The amount of MgO in Examples S-X was maintained below about 3 mol. % and the liquidus viscosity of the glass was greater than or equal to 90 kP. In these Examples, the glass compositions had an ISO 695 base resistance of A1 both before and after ion exchange.

TABLE 5

Composition and Properties of Examples R-W

| (Mol %) | EX. S | EX. T | EX. U | EX. V | EX. W | EX. X |
| --- | --- | --- | --- | --- | --- | --- |
| $SiO_2$ | 72.4 | 72.3 | 72.3 | 72.2 | 72.4 | 72.3 |
| $Al_2O_3$ | 7.4 | 7.4 | 7.4 | 7.3 | 7.4 | 7.1 |

TABLE 5-continued

Composition and Properties of Examples R-W

| (Mol %) | EX. S | EX. T | EX. U | EX. V | EX. W | EX. X |
| --- | --- | --- | --- | --- | --- | --- |
| $Li_2O$ | 1.5 | 1.8 | 1.5 | 2.3 | 0 | 2.0 |
| $Na_2O$ | 7.0 | 6.6 | 6.6 | 6.0 | 8.0 | 6.9 |
| $K_2O$ | 0.5 | 0.5 | 0.5 | 0.5 | 0.5 | 0.5 |
| MgO | 2.6 | 2.8 | 2.3 | 2.6 | 2.6 | 2.6 |
| CaO | 5.3 | 5.3 | 5.8 | 5.8 | 5.3 | 5.3 |
| SrO | 3.3 | 3.3 | 2.2 | 3.3 | 3.8 | 3.3 |
| ZnO | 0 | 0 | 1.4 | 0 | 0 | 0 |

TABLE 5-continued

Composition and Properties of Examples R-W

| (Mol %) | EX. S | EX. T | EX. U | EX. V | EX. W | EX. X |
|---|---|---|---|---|---|---|
| $SnO_2$ | 0.3 | 0.3 | 0.3 | 0.3 | 0.3 | 0.3 |
| soft pt (° C.) | 841 | 839 | 852 | 829 | 879 | 822 |
| 200P (° C.) | 1600 | 1596 | 1615 | 1593 | 1628 | 1584 |
| liquidus visc (kP) | 145 kP | 90 kP | 132 kP | 100 kP | 205 kP | 87 kP |
| DEV-12116 (S1 rating <0.70) | | | | | | |
| NIX | 0.89 | 0.75 | 1.08 | 1.16 | 0.99 | 1.06 |
| IX | 0.74 | 1.09 | 0.94 | 1.13 | 1.41 | 1.06 |
| ISO-695 (A1 rating <75) | | | | | | |
| NIX | 45.4 | 39.1 | 42.5 | 41.7 | 51.5 | 45.8 |
| IX | 27.3 | 49.3 | 52.3 | 48.5 | 49.1 | 48.4 |
| ISO-720 (HGA-1 rating <62) | | | | | | |
| NIX | 63.7 | 66.4 | 61.0 | 70.5 | 65.7 | 73.3 |
| IX | 33.6 | 31.5 | 35.6 | 42.5 | 39.0 | 45.2 |
| IX (100% $KNO_3$) | | | | | | |
| 490° C.-8 hr (MPa, μm) | 642, 27 | 648, 24 | 650, 27 | 640, 22 | 630, 32 | 620, 25 |
| 490° C.-24 hr (MPa, μm) | 563, 46 | 573, 43 | 525, 43 | 574, 38 | 608, 55 | 606, 46 |

Table 6 contains the composition and properties of several inventive examples of alkaline earth alumino-silicate glass compositions which include alkaline earth oxides with reduced amounts of MgO. Specifically, in Examples AA-EE, MgO in the alkaline earth oxide was replaced with SrO and, in some embodiments, ZnO, in order to decrease the liquidus temperature, increase the liquidus viscosity and improve the formability and the chemical durability of the glass. The amount of MgO in Examples AA-EE was maintained below about 3.5 mol. % and the liquidus viscosity of the glass was greater than or equal to 200 kP due to the addition of SrO in conjunction with CaO, ZnO and/or $Li_2O$. In these Examples, the glass compositions had an ISO 695 base resistance of A1 both before and after ion exchange. Furthermore, Examples AA-EE each exhibited an ISO 720 hydrolytic resistance of HGA1 both before and after ion exchange.

TABLE 6

Composition and Properties of Examples AA-EE

| | AA | BB | CC | DD | EE |
|---|---|---|---|---|---|
| (Mol %) | | | | | |
| $SiO_2$ | 72.4 | 724 | 72.5 | 72.4 | 72.5 |
| $Al_2O_3$ | 7.4 | 7.4 | 7.6 | 7.4 | 7.6 |
| $Li_2O$ | 0 | 0 | 0 | 2.0 | 2.0 |
| $Na_2O$ | 8.0 | 8.0 | 9.0 | 6.0 | 6.7 |
| $K_2O$ | 0.5 | 0.5 | 0.5 | 0.5 | 0.5 |
| MgO | 2.6 | 2.6 | 2.6 | 2.6 | 3.1 |
| CaO | 4.3 | 3.3 | 2.5 | 2.3 | 2.3 |
| SrO | 4.8 | 5.8 | 3.8 | 4.8 | 3.3 |
| ZnO | 0 | 0 | 1.5 | 2.0 | 2.0 |
| $SnO_2$ | 0.3 | 0.3 | 0.3 | 0.3 | 0.3 |
| soft pt (° C.) | 878 | 874 | 878 | 843 | 848 |

TABLE 6-continued

Composition and Properties of Examples AA-EE

| | AA | BB | CC | DD | EE |
|---|---|---|---|---|---|
| 200P (° C.) | 1618 | 1623 | 1658 | 1612 | 1643 |
| liquidus visc (kP) | 400 kP | 315 kP | 550 kP | 200 kP | 350 kP |
| DIN-12116 (S1 rating <0.70) | | | | | |
| NIX | 1.81 | 1.56 | 1.28 | 1.02 | 1.11 |
| IX | 3.07 | 1.34 | 1.53 | 2.49 | 3.66 |
| ISO-695 (A1 rating <75) | | | | | |
| NIX | 51.6 | 53.4 | 48.6 | 40 | 44.2 |
| IX | 49.5 | 52.8 | 42.3 | 47.6 | 56.7 |
| ISO-720 (HGA-1 rating <62) | | | | | |
| NIX | 58.2 | 59.6 | 53.4 | 48.6 | 55.3 |
| IX | 32.9 | 39.7 | 36.2 | 41.1 | 43.8 |
| IX (100% $KNO_3$) | | | | | |
| 490° C.-8 hr (MPa, μm) | 651, 29 | 626, 29 | 695, 40 | 673, 21 | 683, 28 |
| 490° C.-24 hr (MPa, μm) | 617, 51 | 601, 49 | 633, 66 | 625, 38 | 630, 49 |

Accordingly, based on the foregoing examples, it should be understood that some of the glass compositions described herein have an ISO 720 hydrolytic resistance of HGA1 both before and after ion-exchange strengthening while other glass compositions have an ISO 720 hydrolytic resistance only after ion-exchange strengthening. While not wishing to be bound by theory, it is believe that the improvement in the hydrolytic resistance, base resistance, and acid resistance following ion-exchange strengthening of the glass substrate is due, at least in part, to the compressive stress imparted to the glass which is believed to limit the removal of ions from the glass network.

As noted above, in some embodiments, maintaining the ratio MgO:ΣRO in the glass compositions to be less than 0.3 generally increases the liquidus viscosity of the glass composition to greater than about 90 kP which, in turn, improves the formability of the glass composition. Table 7 below includes several of the inventive glass compositions described above in which the ratio MgO:ΣRO is less than 0.3 and the corresponding liquidus viscosities. Composition FF included 72.3 mol. % $SiO_2$, 7.1 mol. % $Al_2O_3$, 2 mol. % $Li_2O$, 6.9 mol. % $Na_2O$, 0.5 mol. % $K_2O$, 2.6 mol. % MgO, 5.3 mol. % CaO, 3.3 mol. % SrO, and 0.3 mol. % $SnO_2$. At high MgO levels (or more precisely, at high activity levels of MgO), the liquidus phase is forsterite ($Mg_2SiO_4$), a persistent phase that readily crystallizes at high temperature during cooling of the melt, resulting in low (<50 kP) liquidus viscosities. It has been found that forsterite formation can be delayed to lower temperature/higher liquidus viscosity if MgO activity is minimized. It has also been found that MgO activity can be minimized by maintaining the MgO:ΣRO ratio to <0.30.

TABLE 7

Ratio MgO:ΣRO

| Example | MgO:ΣRO | Liquidus Viscosity (kP) |
|---|---|---|
| S | 0.24 | 145 kP |
| T | 0.25 | 90 kP |
| U | 0.20 | 132 kP |
| V | 0.20 | 100 kP |
| X | 0.22 | 205 kP |

TABLE 7-continued

| | Ratio MgO:ΣRO | |
|---|---|---|
| Example | MgO:ΣRO | Liquidus Viscosity (kP) |
| AA | 0.22 | 400 kP |
| BB | 0.22 | 315 kP |
| CC | 0.25 | 550 kP |
| DD | 0.22 | 200 kP |
| EE | 0.29 | 350 kP |
| FF | 0.23 | 145 kP |

It should now be understood that the glass compositions described herein exhibit chemical durability as well as mechanical durability following ion exchange. These properties make the glass compositions well suited for use in various applications including, without limitation, pharmaceutical packaging materials.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass composition comprising:
from 67 mol. % to about 75 mol. % $SiO_2$;
from about 6 mol. % to about 10 mol. % $Al_2O_3$;
from about 5 mol. % to about 12 mol. % alkali oxide, wherein the alkali oxide comprises $Na_2O$ and $K_2O$ and the $K_2O$ is present in an amount less than or equal to 0.5 mol. %; and
from about 9 mol. % to about 15 mol. % of alkaline earth oxide, the alkaline earth oxide comprising greater than 0 mol. % and less than or equal to 3 mol. % MgO and from about 2 mol. % to about 7 mol% CaO, wherein a ratio of a concentration of MgO to the sum of the concentration of divalent cations (MgO:ΣRO) is less than 0.3 and the glass composition is susceptible to strengthening by ion-exchange.

2. The glass composition of claim 1 wherein $SiO_2$ is present in the glass composition in a concentration from about 67 mol. % to about 73 mol. %.

3. The glass composition of claim 1, wherein $Al_2O_3$ is present in the glass composition in a concentration from about 7 mol. % to about 10 mol. %.

4. The glass composition of claim 1, wherein the glass composition comprises less than 1 mol. % $B_2O_3$.

5. The glass composition of claim 1, wherein the glass composition is free from boron and compounds of boron.

6. The glass composition of claim 1, wherein the glass composition is free from barium and compounds of barium.

7. The glass composition of claim 1, wherein the alkali metal oxide further comprises $Li_2O$ in an amount from about 1 mol. % to about 3 mol. %.

8. The glass composition of claim 1, wherein the $Na_2O$ is present in an amount from about 3.5 mol. % to about 8 mol. %.

9. The glass composition of claim 1, wherein the alkaline earth oxide is present in an amount from about 10 mol. % to about 14 mol. %.

10. The glass composition of claim 1, wherein MgO is present in an amount greater than 0 mol. % and less than or equal to 2.5 mol. %.

11. The glass composition of claim 1 further comprising $ZrO_2$ in an amount less than or equal to about 1.5 mol. %.

12. The glass composition of claim 1, further comprising ZnO in an amount less than or equal to about 2.0 mol. %.

13. The glass composition of claim 1 further comprising $SnO_2$ in an amount less than or equal to about 0.3 mol. %.

14. The glass composition of claim 1, wherein the glass composition is substantially free from phosphorous and compounds of phosphorous.

15. The glass composition of claim 1, wherein the glass composition has a liquidus viscosity greater than or equal to 85 kP.

16. The glass composition of claim 1, wherein the glass composition has at least a class S3 acid resistance according to DIN 12116 both before and after ion-exchange strengthening.

17. The glass composition of claim 1, wherein the glass composition has a class A1 base resistance according to ISO 695 both before and after ion-exchange strengthening.

18. The glass composition of claim 1, wherein the glass composition has a type HGA1 hydrolytic resistance according to ISO 720 after ion exchange strengthening.

19. The glass composition of claim 1, wherein the glass composition has a Type HGA1 hydrolytic resistance according to ISO 720 before strengthening by ion exchange and after strengthening by ion exchange.

20. The glass composition of claim 1, wherein the alkaline earth oxide comprises at least one of SrO and BaO.

21. The glass composition of claim 20, wherein the alkaline earth oxide comprises SrO in an amount greater than or equal to about 1 mol. % and less than or equal to about 2 mol. %.

22. The glass composition of claim 20, wherein the alkaline earth oxide comprises SrO in an amount greater than 0 mol. % and less than or equal to about 6 mol. %.

23. A glass composition comprising:
from 67 mol. % to about 75 mol. % $SiO_2$;
from about 6 mol. % to about 10 mol. % $Al_2O_3$;
from about 5 mol. % to about 12 mol. % alkali oxide, wherein the alkali oxide comprises $K_2O$ in an amount less than or equal to 0.5 mol. %;
from about 9 mol. % to about 15 mol. % of alkaline earth oxide, wherein the alkaline earth oxide comprises greater than 0 mol. % and less than or equal to 3 mol, % MgO, from about 2 mol. % to about 7 mol% CaO, at least one of SrO and BaO, wherein:
a ratio of a concentration og MgO to the sum of the concentration of divalent cations (MgO:ΣRO) is less than 0.3;
the glass composition is free from boron and compounds of boron;
the glass composition is free from phosphorous and compounds of phosphorous; and
the glass composition is ion exchangeable to a depth of layer greater than or equal to about 15 μm with a corresponding compressive stress greater than or equal to about 250 MPa.

24. The glass composition of claim 23, wherein the alkali oxide comprises $Na_2O$ in an amount from about 3.5 mol. % to about 8 mol. %.

25. The glass composition of claim 23, wherein the alkaline earth oxide comprises SrO in an amount greater than or equal to about 1 mol. % and less than or equal to about 2 mol. %.

26. The glass composition of claim 23, wherein the alkaline earth oxide comprises SrO in an amount greater than 0 mol. % and less than or equal to about 6 mol. %.

27. The glass composition of claim 23, wherein the glass composition is free from barium and compounds of barium.

28. The glass composition of claim 23, wherein a concentration of $Al_2O_3$ is about 7 mol % to about 10 mol. %.

29. The glass composition of claim 23, wherein the alkali metal oxide further comprises $Li_2O$ in an amount from about 1 mol. % to about 3 mol. %.

30. The glass composition of claim 23, wherein the alkaline earth oxide is present in an amount from about 10 mol. % to about 14 mol. %.

31. The glass composition of claim 23, wherein the glass composition comprises:
from about 2 mol. % to about 5 mol. % CaO; and
from about 3 mol. % to about 6 mol. % SrO.

32. The glass composition of claim 23 further comprising $ZrO_2$ in an amount less than or equal to about 1.5 mol. %.

33. The glass composition of claim 23, further comprising ZnO in an amount less than or equal to about 2.0 mol. %.

34. The glass composition of claim 23, wherein the glass composition has a liquidus viscosity greater than or equal to 85 kP.

35. The glass composition of claim 23, wherein the glass composition has at least a class S3 acid resistance according to DIN 2116 both before and after ion-exchange strengthening.

36. The glass composition of claim 23, wherein the glass composition has a class A1 base resistance according to ISO 695 both before and after ion-exchange strengthening.

37. The glass composition of claim 23, wherein the glass composition has a type HGA1 hydrolytic resistance according to ISO 720 after ion-exchange strengthening.

38. The glass composition of claim 23, wherein the glass composition has a Type HGA1 hydrolytic resistance according to ISO 720 before strengthening by ion exchange and after strengthening by ion exchange.

39. The glass composition of claim 23, wherein MgO is present in an amount greater than 0 mol. % and less than or equal to 2.5 mol. %.

40. The glass composition of claim 39, wherein the glass composition further comprises ZnO in an amount less than or equal to 2.0 mol. %.

41. The glass composition of claim 39, wherein the glass composition is free from zinc and compounds containing zinc.

42. The glass composition of claim 39, wherein the glass composition further comprises $Li_2O$ in an amount greater than or equal to 1 mol. % and less than or equal to 3 mol. %.

43. The glass composition of claim 39, wherein the glass composition is free from lithium and compounds containing lithium.

44. The glass composition of claim 39, wherein the glass composition comprises:
from about 5 mol. % to about 6 mol. % CaO; and
from about 2 mol. % to about 4 mol. % SrO.

45. A glass article formed from glass having a composition comprising:
from 67 mol. % to about 75 mol. % $SiO_2$;
from about 6 mol. % to about 10 mol. % $Al_2O_3$;
from about 5 mol. % to about 12 mol. % alkali oxide, wherein the alkali oxide comprises $Na_2O$ and $K_2O$ and the $K_2O$ is present in an amount less than or equal to 0.5 mol. %;
from about 9 mol. % to about 15 mol. % of alkaline earth oxide, the Alkaline earth oxide comprising greater than 0 mol. % and less than or equal to 3.0 mol. % MgO And from about 2 mol. % to about 7 mol.% CaO, wherein a ratio of a concentration of MgO to the sum of the concentration of divalent cations (MgO:ΣRO) is less than 0.3, wherein the composition is free from boron and compounds of boron and the glass article has:
at least a class S3 acid resistance according to DIN 12116;
a class A1 base resistance according to ISO 695; and
a type HGA1 hydrolytic resistance according to ISO 720.

46. The glass article of claim 45, wherein the glass article has a coefficient of thermal expansion less than or equal to $70 \times 10^{-7} K^{-1}$.

47. The glass composition of claim 45, wherein the glass composition is substantially free from phosphorous and compounds of phosphorous.

48. The glass article of claim 45, wherein the glass article has a compressive stress greater than or equal to about 250 MPa.

49. The glass article of claim 48, wherein the glass article has a depth of layer greater than or equal to about 15 μm.

* * * * *

UNITED STATES PATENT AND TRADEMARK OFFICE
CERTIFICATE OF CORRECTION

PATENT NO.         : 9,145,329 B2
APPLICATION NO.    : 13/660141
DATED              : September 29, 2015
INVENTOR(S)        : Melinda Ann Drake et al.

It is certified that error appears in the above-identified patent and that said Letters Patent is hereby corrected as shown below:

IN THE CLAIMS

In Column 20, line 41, change "3 mol, %" to --3 mol. %--;

In Column 20, line 44, change "og" to --of--;

In Column 22, line 18, change "Alkaline" to --alkaline--;

In Column 22, line 19, change "And" to --and--.

Signed and Sealed this
Fifth Day of April, 2016

Michelle K. Lee
*Director of the United States Patent and Trademark Office*